March 9, 1954 — F. P. BINGMAN — 2,671,562
APPARATUS FOR ACCUMULATING AND AUTOMATICALLY REMOVING PAINT SLUDGE
Filed Sept. 10, 1949 — 2 Sheets-Sheet 1
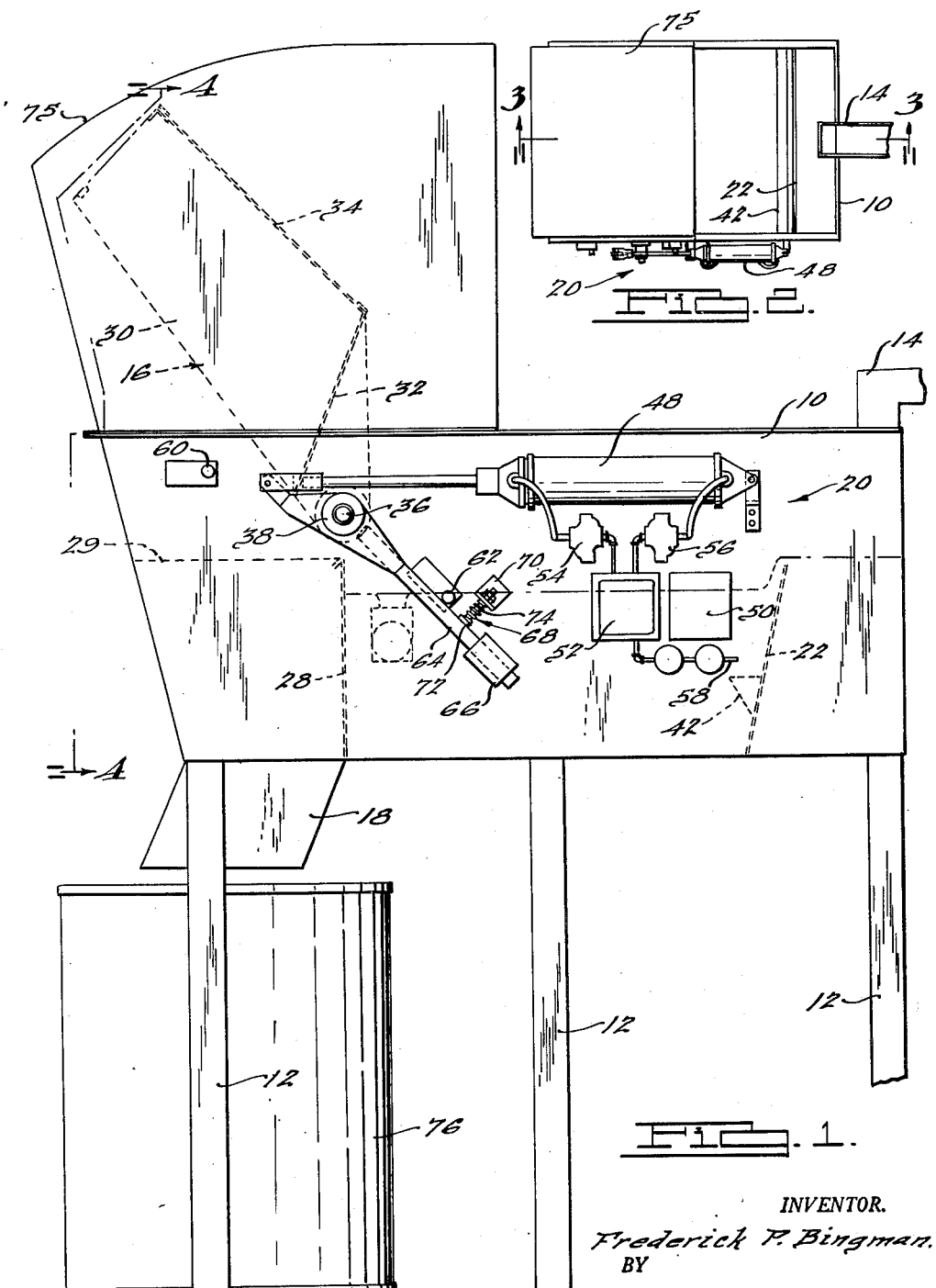
INVENTOR.
Frederick P. Bingman,
BY
Harness, Dickey & Pierce
ATTORNEYS.

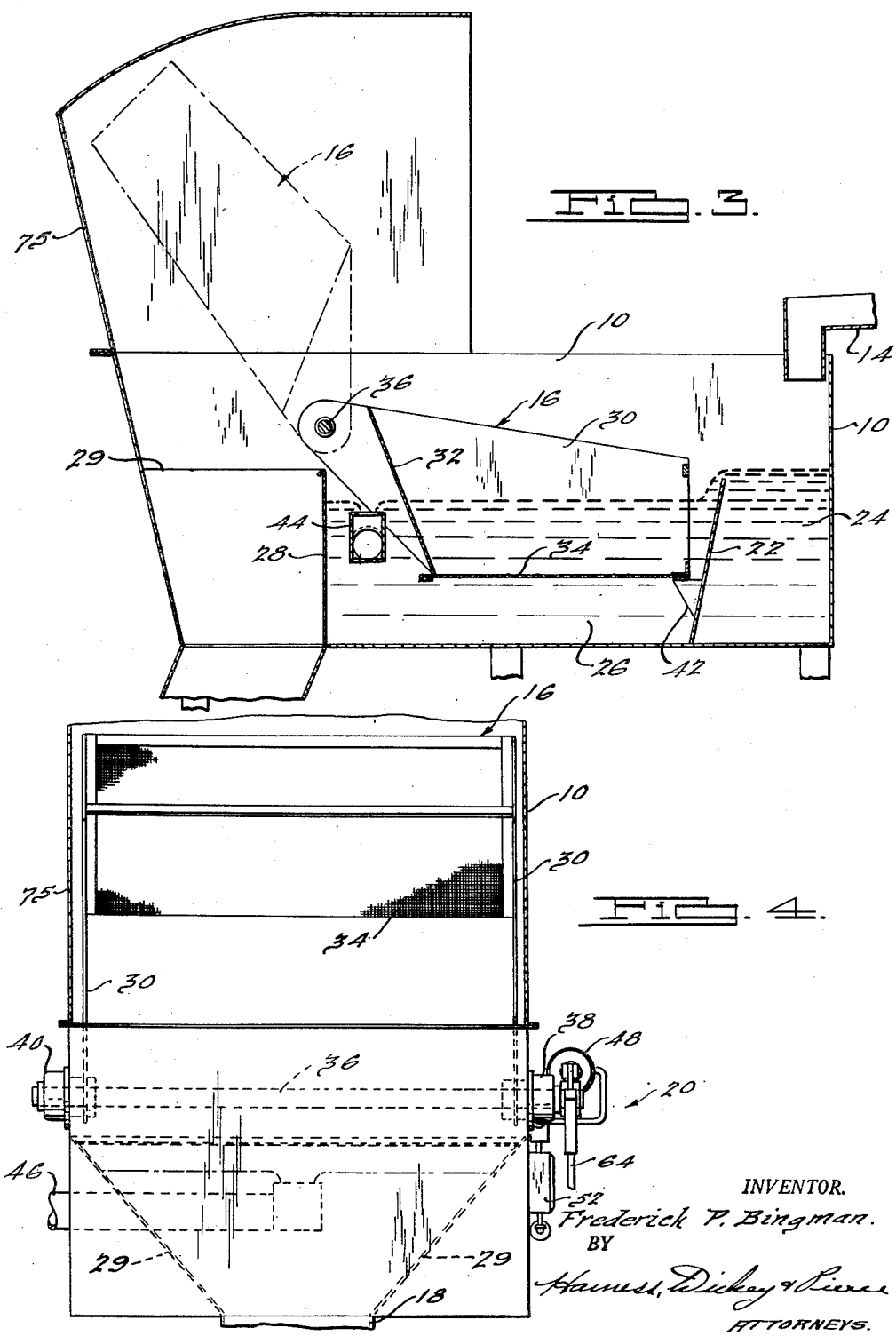

Patented Mar. 9, 1954

2,671,562

UNITED STATES PATENT OFFICE 2,671,562

APPARATUS FOR ACCUMULATING AND AUTOMATICALLY REMOVING PAINT SLUDGE

Frederick P. Bingman, Birmingham, Mich., assignor to The R. C. Mahon Company, Detroit, Mich., a corporation of Michigan Application September 10, 1949, Serial No. 114,988

4 Claims. (Cl. 210—149)

1

The present application relates to an improved apparatus for collecting, separating, and removing material floating on the surface of a liquid.

It is conventional practice in paint spray booths to collect the paint overspray in a liquid contained in a tank forming a part of the spray booth apparatus. This paint overspray forms a sludge which floats on the surface of the liquid and which may be removed from the surface of the tank by suitable means, such for example, as the eductor apparatus illustrated in my copending application, Serial No. 114,987, filed September 10, 1949. Any such means of removing the paint sludge from the spray booth tank usually results in the removal of some of the liquid from the spray booth tank also.

Accordingly, it is an object of the present invention to provide a simple and efficient apparatus for separating floating material from the liquid in which it floats.

A further object of the invention is to provide an efficient apparatus for automatically accumulating material floating in a liquid and separating and removing the material from the liquid.

Other and more detailed objects of the invention will become apparent from a consideration of the following specification, the appended claims and the accompanying drawings, throughout the several views of which like reference characters designate like parts and wherein:

Figure 1 is a side elevational view of an apparatus embodying the present invention and illustrating the bucket in the raised or dumping position;

Fig. 2 is a plan view of the construction illustrated in Fig. 1;

Fig. 3 is an enlarged broken sectional view of the construction illustrated in Fig. 2 taken along the line 3—3 thereof; and, Fig. 4 is a broken sectional view of the construction illustrated in Fig. 1 taken along the line 4—4 thereof.

It will be appreciated from a complete understanding of the present invention that the improvements thereof may be readily employed for the separation and removal of a wide variety of materials from a liquid in which they are carried. In an illustrative but not a limiting sense, the improvements of the present invention are herein illustrated and described as embodied in an apparatus for accumulating and removing paint sludge floating in a liquid.

Referring to the drawings, the preferred embodiment there illustrated generally comprises a tank 10, supported on a plurality of spaced legs 12, and to which liquid carrying a paint sludge is delivered through a trough 14 emptying into the tank 10 at one end thereof, a bucket 16 pivotally mounted on the tank 10, means for moving the bucket 16 between a first position in which it is disposed within the tank 10 so that paint sludge may accumulate in it, and a second position in which it is adapted to discharge the paint sludge through a chute 18 formed at the other end of the tank 10, and mechanism generally indicated at 20 and carried on the side of the tank 10 for automatically moving the bucket between the two described positions in a predetermined desired cycle.

The tank 10 is generally rectangular in shape and open at the top. The trough 14, through which the liquid and paint sludge carried therein is delivered to the tank, is disposed to discharge the liquid and paint sludge into the tank at the right hand end thereof as viewed in Figs. 1, 2 and 3. In spaced relation to this right hand end is a transversely extending wall 22 which extends upwardly from the bottom of the tank 10 and cooperates with the sides and adjacent end of the tank to define a reservoir portion 24 into which the liquid and paint sludge are discharged from a conduit 14. The upper edge of the wall 22 defines a weir over which the liquid and paint sludge floating therein flows into a larger reservoir portion 26 defined by the wall 22, the opposite sides of the tank 10 and a second transversely extending wall 28 disposed in spaced relation to the opposite or left hand end of the tank 10 as viewed in Figs. 1, 2 and 3. The wall 28 also cooperates with the inclined adjacent end wall of the tank 10 and a pair of oppositely inclined plates 29 to define the upper portion of the chute 18 into which the paint sludge is discharged from the bucket 16. The plates 29 are disposed with their upper edges at the opposite side walls of the tank 10 and slope inwardly to guide material therein into the lower portion of the chute 18.

The bucket 16 comprises a pair of spaced parallel side walls 30, a transversely extending inclined wall 32 at the back or left hand side thereof, as viewed in Fig. 3, and a bottom screen 34. The opposite sides 30 of the bucket are extended upwardly and to the left, as viewed in Fig. 3, and interconnected by a horizontally spaced transversely extending pivot rod 36 which is journalled at its opposite ends in bearings 38 and 40 supported on the opposite sides of the tank 10. It will be noted that the side of the bucket 16 remote from the pivot rod 36, or opposite the inclined wall 32 is adjacent the wall 22 and is open permitting liquid and paint sludge floating therein to flow into the bucket between the spaced side walls 30 thereof. A transversely extending support 42 is fixed on the wall 22 in position to support the bucket 16 in the position illustrated in full lines in Fig. 3 in which it is disposed within the reservoir portion 26 and adapted to receive and accumulate paint sludge floating in the liquid.

Adjacent the wall 28 and within the reservoir portion 26 at the opposite side of the bucket 16 from the wall 22 is an outlet box 44 which may be connected by a suitable line 46 through which liquid from the reservoir section 26 may be returned to a spray booth tank if desired. It will be noted that by virtue of the arrangement above described, the liquid in which the paint sludge is carried flows from the reservoir section 24 over the weir defined by the wall 22, into the bucket 16 downwardly through the screen 34 and thence to the outlet box 44. This provides a current resulting in the accumulation of the paint sludge at the back of the bucket 16 or adjacent the wall 32.

It will be appreciated that in the broader aspects of the present invention any suitable means may be provided for pivoting the bucket 16 from the full line position illustrated in Fig. 3 in which the paint sludge is accumulated in the bucket to the position there illustrated in broken lines and illustrated in dotted lines in Fig. 1. In the preferred embodiment of the invention illustrated in the drawings, the apparatus for automatically pivotally moving the bucket 16 includes a pneumatic cylinder 48, a timer generally indicated at 50 and valves 52, 54 and 56 through which air pressure from a supply line 58 is supplied to the pneumatic cylinder 48. This apparatus may be of any conventional construction permitting the cycle of operation of the bucket 16 to be varied as desired. This mechanism also includes limit switches 60 and 62 which are connected with the valves by conventional means not shown.

These limit switches are actuated by an arm 64 fixed to the pivot bar 36 and extending in a direction away from the bucket 16. This arm 64 carries a counterweight 66 and at the limit of its movement, corresponding to the raised or dumping position of the bucket 16, the arm 64 engages a stop 68 secured on the side of the tank 10. The engagement of the arm 64 with the stop 68 provides a sudden or abrupt termination of the upward movement of the bucket 16, thereby jarring loose any paint sludge which might otherwise tend to cling to the bucket. In the construction illustrated, the stop 68 comprises an angle bracket 70 welded or otherwise suitably secured to the side of the tank 10 and a stop bolt 72 carried by the bracket 70 and which is resiliently held in the desired position for engaging the arm 64 by a relatively heavy spring 74. To prevent paint sludge from being thrown over the walls of the tank 10 by the bucket in its movement to its raised position, a hood 75 is mounted on and extends above the tank 10 at the left hand end thereof as viewed in Figs. 1 and 3.

The lower portion of the chute 18, into which the paint sludge is dumped by the bucket 16, extends below the tank 10 and is adapted to direct the paint sludge into a conventional drum 76 or other suitable receptacle.

It will now be readily appreciated from the foregoing description of the present apparatus that in use, the paint sludge and the liquid in which it is carried is received in the reservoir portion 24 of the tank 10 between the wall 22 and the adjacent end wall of the tank from which it flows over the weir defined by the wall 22 and the paint sludge, because of the above described currents within the reservoir portion 26, collects in the bucket 16 adjacent the wall 32 thereof. The apparatus 20 for automatically moving the bucket between its lowered or sludge accumulating position and its raised or sludge dumping position is adjusted, depending upon the rate at which sludge is being supplied to the tank 10 so that periodically the sludge accumulated in the bucket 16 is dumped therefrom into the chute 18, through which it passes into the drum 76. Immediately upon dumping the paint sludge, the bucket 16 returns to the lowered sludge accumulating position illustrated in full lines in Fig. 3 and the cycle of operation is again repeated.

While only one specific embodiment of the invention has been illustrated and described in detail, it will be readily appreciated by those skilled in the art that numerous modifications and changes may be made without departing from the spirit of the present invention.

What is claimed is:

1. An apparatus for separating a material floating in a liquid from the liquid, said apparatus comprising means defining a reservoir adapted to receive said liquid with said material floating therein, a bucket perforated to permit liquid to flow therethrough and open at one side, means mounting said bucket for oscillatory movement between a stationary collecting position within said reservoir with the side walls at the remaining sides of said bucket extending above the level to which said liquid fills said reservoir and in which liquid and material floating therein may flow into said bucket at said one side to collect said material floating in said liquid in said bucket and a second position in which said bucket is adapted to discharge its contents clear of said reservoir, means for creating currents in said tank causing material floating in said liquid to be carried into said bucket, said last named means comprising a weir in said reservoir adjacent said one side of said bucket and over which liquid flows toward said one side of said bucket when the latter is in said first position and means defining an outlet passage opening into said reservoir below said weir and at the opposite side of said one side of said bucket when the latter is in said first position, from said weir, and means for moving said bucket between said positions.

2. An apparatus for separating a material floating in a liquid from the liquid, said apparatus comprising means defining a reservoir, means for substantially maintaining a desired liquid level in said reservoir, a bucket perforated to permit flow of said liquid therethrough and open at one side, means mounting said bucket for oscillatory movement between a stationary collecting position and a second position in which said bucket is adapted to discharge its contents clear of the liquid in said reservoir, means for supporting said bucket in said collecting position with the side walls at the remaining sides of said bucket extending above said liquid level, means for creating a current in said liquid flowing into said bucket through said open one side and out through said perforations to collect said material floating in said liquid in said bucket, and means for moving said bucket between said positions.

3. An apparatus for separating a material floating in a liquid from the liquid, said apparatus comprising a tank adapted to receive said liquid with said material floating therein, means for substantially maintaining a desired liquid level in said tank, a bucket open at the top and at one side and apertured to pass liquid therethrough, means mounting said bucket for oscillatory movement between a stationary collecting position in which it is disposed in said tank so that liquid in said tank and material floating therein may flow into said bucket through said one side thereof and a second position in which said bucket is adapted to discharge its contents clear of said tank, means on said tank for supporting said bucket in said stationary collecting position with the side walls at the remaining sides of said bucket extending above said liquid level, means for creating a current in said liquid in said tank flowing into said bucket through said open one side and out through the apertures for controlling said material floating in said liquid in said bucket, and means for moving said bucket between said positions.

4. An apparatus for separating a material floating in a liquid from the liquid, said apparatus comprising means defining a tank adapted to receive said liquid and said material floating therein, means for substantially maintaining a desired liquid level in said tank, a chute disposed adjacent said tank for receiving material separated from the liquid in said tank, a bucket open at the top and at one side and apertured to pass liquid therethrough, means mounting said bucket for pivotal oscillatory movement about a horizontal axis remote from said open one side of said bucket between a stationary collecting position in which said bucket is so disposed in said tank that liquid in said tank and said material floating therein may flow into said bucket through said one side thereof and a second position in which said bucket is adapted to discharge material collected therein into said chute, means for supporting said bucket in said stationary collecting position with the side walls of the remaining sides of said bucket extending above said liquid level, means for creating a current in said liquid in said tank flowing into said bucket through said open one side thereof and out through the apertures in said bucket to collect said material floating in said liquid in said bucket, and means for automatically moving said bucket from said stationary collecting position to said second position and returning said bucket to said stationary collecting position at predetermined intervals.

FREDERICK P. BINGMAN.

References Cited in the file of this patent

UNITED STATES PATENTS

| Number | Name | Date |
|---|---|---|
| 633,040 | Reed | Sept. 12, 1899 |
| 767,747 | Green | Aug. 16, 1904 |
| 1,709,291 | Vidler | Apr. 16, 1929 |
| 1,970,788 | Wynne et al. | Aug. 21, 1934 |
| 1,981,310 | Currie | Nov. 20, 1934 |
| 2,071,670 | Warner | Feb. 23, 1937 |
| 2,107,532 | Hallenbeck | Feb. 8, 1938 |
| 2,234,599 | Johnston | Mar. 11, 1941 |
| 2,266,840 | Alexander et al. | Dec. 23, 1941 |
| 2,330,589 | Juell | Sept. 28, 1943 |
| 2,501,924 | Verdoorn et al. | Mar. 28, 1950 |

FOREIGN PATENTS

| Number | Country | Date |
|---|---|---|
| 347,969 | Germany | Jan. 28, 1922 |
| 465,212 | Germany | Sept. 10, 1928 |